United States Patent
Dolby et al.

(10) Patent No.: US 8,607,191 B2
(45) Date of Patent: Dec. 10, 2013

(54) AUTOMATED DISCOVERY OF PROGRAMMATIC RESOURCES

(75) Inventors: Julian T. Dolby, Riverdale, NY (US); Richard T. Goodwin, Hawthorne, NY (US); Anca A. Ivan, San Jose, CA (US); Igor A. Naumov, Plano, TX (US); Manas R. Kumar Singh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 12/828,272

(22) Filed: Jun. 30, 2010

(65) Prior Publication Data
US 2012/0005647 A1  Jan. 5, 2012

(51) Int. Cl.
*G06F 9/44* (2006.01)
(52) U.S. Cl.
USPC ............ 717/109; 717/105; 717/106; 717/113
(58) Field of Classification Search
None
See application file for complete search history.

(56) References Cited

U.S. PATENT DOCUMENTS

| | | | | |
|---|---|---|---|---|
| 6,792,595 | B1 * | 9/2004 | Storistenau et al. | 717/109 |
| 7,137,100 | B2 * | 11/2006 | Iborra et al. | 717/106 |
| 7,243,306 | B1 | 7/2007 | Joshi et al. | |
| 7,814,458 | B2 | 10/2010 | Kalia et al. | |
| 8,104,017 | B2 * | 1/2012 | Lin et al. | 717/109 |
| 8,234,634 | B2 * | 7/2012 | Coqueret et al. | 717/109 |
| 8,307,337 | B2 * | 11/2012 | Chamieh et al. | 717/113 |
| 2003/0110472 | A1 * | 6/2003 | Alloing et al. | 717/122 |
| 2003/0121027 | A1 * | 6/2003 | Hines | 717/113 |
| 2005/0119905 | A1 | 6/2005 | Wong et al. | |

(Continued)

FOREIGN PATENT DOCUMENTS

CN  101063934  10/2007

OTHER PUBLICATIONS

Khaled El Emam; Software Engineering Processes—Chapter 9; [May 2001]; retrieved online Jul. 30, 2013; pp. 1-18. Retrieved from Internet: <URL: http://sce.uhcl.edu/helm/swebok_ieee/data/swebok_chapter_09.pdf>.*

(Continued)

*Primary Examiner* — Thuy Dao
*Assistant Examiner* — Hanh T Bui
(74) *Attorney, Agent, or Firm* — Steven M. Greenberg, Esq.; Carey, Rodriguez, Greenberg & O'Keefe

(57) ABSTRACT

A method for business process to customized program code mapping in a pre-packaged computing solution can include establishing a connection from a business process to code mapping module executing in memory by a processor of a computer to a source pre-packaged computing solution, extracting both a business process hierarchy (BPH) and customized program code from the source pre-packaged computing solution, storing the BPH and the extracted customized program code in storage coupled to the computer, selecting a business process in the BPH and mapping the selected business process to corresponding portions of the customized program code, and generating and displaying in the computer a dependency graph indicating dependency relationships of the mapped portions of the customized program code for the selected business process of the BPH of the source pre-packaged computing solution.

12 Claims, 2 Drawing Sheets

(56) References Cited

U.S. PATENT DOCUMENTS

| | | | |
|---|---|---|---|
| 2005/0125449 A1 | 6/2005 | Wong et al. | |
| 2005/0125450 A1 | 6/2005 | Wong et al. | |
| 2005/0125768 A1 | 6/2005 | Wong et al. | |
| 2005/0246682 A1* | 11/2005 | Hines | 717/109 |
| 2005/0289508 A1* | 12/2005 | Illowsky et al. | 717/106 |
| 2006/0048093 A1 | 3/2006 | Jain et al. | |
| 2006/0168558 A1* | 7/2006 | de Seabra e Melo et al. | 717/105 |
| 2006/0206831 A1 | 9/2006 | Beck et al. | |
| 2007/0180426 A1 | 8/2007 | Moulckers et al. | |
| 2007/0288899 A1 | 12/2007 | Fanning et al. | |
| 2008/0244517 A1* | 10/2008 | Rostoker | 717/120 |
| 2010/0031232 A1* | 2/2010 | Glazier et al. | 717/106 |
| 2012/0254830 A1* | 10/2012 | Conrad et al. | 717/106 |

OTHER PUBLICATIONS

Raman Ramsin and Richard F. Paige; Process-Centered Review of Object Oriented Software Development Mehtodologies; [2008-15]; retrieved online Jul. 30, 2013; pp. 1-89; Retrieved from the Internet: <URL: http://delivery.acm.org/10.1145/1330000/1322435/a3-ramsin.pdf?.*

Abhishek Rohatgi et al.; An Approach for Mapping Features to Code; [2008]; retrieved online on Jul. 30, 2013; pp. 236-241; Retrieved from the Internet: <URL: http://ieeexplore.ieee.org/stamp/stamp.jsp?tp=&arnumber=4556137>.*

* cited by examiner

… (US 8,607,191 B2)

AUTOMATED DISCOVERY OF PROGRAMMATIC RESOURCES

BACKGROUND OF THE INVENTION

1. Field of the Invention

The present invention relates to static code analysis in general and more particularly to static code analysis for packaged application customization.

2. Description of the Related Art

The traditional computing marketplace provides for pre-packaged computing solutions to various personal and industrial problems. Core pre-packaged computing solutions address the most basic industrial needs, including back office accounting, order entry, inventory and billing. Other advanced pre-packaged computing solutions provide for customer relationship management and enterprise resource management. To the extent that a pre-packaged computing solution does not address the particular needs of an end user, historically the end user would have simply developed a customized solution from scratch using either in-house or contracted software development expertise. Though it is an advantage for the enterprise to enjoy a computing solution developed to specifically address the unique qualities of the enterprise, to do so comes at great cost in terms of required human resources. Yet the enterprise often cannot afford to "fit" a pre-packaged computing solution to the day-to-day business processes of the enterprise.

To address the quandary faced by many in respect to selecting either a pre-packaged computing solution, or developing a completely customized computing solution, customizable pre-packaged computing solutions have been successfully marketed and deployed into the enterprise. In a customizable pre-packaged computing solution, a complete enterprise solution is provided to the end user requiring some modest configuration before deployment. Out of the box, the pre-packaged computing solution can meet many of the needs of the end user. To support the necessity of modification of some of the functionality of the customizable pre-packaged computing solution, the pre-packaged computing solution provides a facility for linking custom program code to the underling application, as well as customized user interface elements and customized data tables. A prime example of a customizable pre-packaged computing solution is the SAP R/3™ computer program product manufactured by SAP A.G. of Walldorf, Federal Republic of Germany.

Once a customizable pre-packaged computing solution has been fully customized to meet the needs of the end user, maintaining the solution can be difficult. In particular, as updates and upgrades to the underlying pre-packaged computing solution become available, customizations must be monitored and occasionally modified to ensure compatibility with the upgrade. Further, as new customizations and/or configuration changes are proposed, those customizations must maintain compatibility with both the underlying pre-packaged computing solution and any inter-dependent customized code. As such, prior to upgrading an installation or consolidating multiple installations of a customizable pre-packaged solution, an analysis phase must be performed in order to determine the shear quantity of customized program code and customized data present, the dependencies between customized program code, tables, and interfaces, the likely effect of changes upon a new system instance, the way in which the program data has been modified and the requisite mapping of the data between systems.

As part of the updating process of a pre-packaged computing solution, a business consultant in addition to an information technologist must first manually discover which portions of customized code for a business process of interest relate to a business process of interest in a business process hierarchy (BPH). Further, an understanding must be developed of the dependencies amongst the manually discovered portions of customized code. Developing an understanding of the dependencies amongst manually discovered portions of customized code can be difficult, however, in view of the vast number of programs, implemented and referenced objects, data tables, and transactions present for an implementation of a pre-packaged computing solution.

BRIEF SUMMARY OF THE INVENTION

Embodiments of the present invention address deficiencies of the art in respect to upgrading a pre-packaged computing solution and provide a novel and non-obvious method, system and computer program product for business process to customized program code mapping in a pre-packaged computing solution. In an embodiment of the invention, a method for business process to customized program code mapping in a pre-packaged computing solution can include establishing a connection from a business process to code mapping module executing in memory by a processor of a computer to a source pre-packaged computing solution, extracting both a business process hierarchy (BPH) and customized program code from the source pre-packaged computing solution and storing the BPH and the extracted customized program code in storage coupled to the computer. The method further can include selecting a business process in the BPH and mapping the selected business process to corresponding portions of the customized program code. Finally, the method can include generating and displaying in the computer a dependency graph of the mapped portions of the customized program code in the storage such that the dependency graph indicates dependency relationships of the mapped portions of the customized program code for the selected business process of the BPH of the source pre-packaged computing solution. Thereafter, the BPH and the mapped portions of the customized program code can be transported from the storage of the computer to a target pre-packaged computing solution.

In another embodiment of the invention, a code mapping data processing system can be provided. The system can include a computer with processor, memory, fixed storage and an operating system executing therein. The computer can be coupled to a pre-packaged computing solution over a computer communications network in that the pre-packaged computing solution includes customized program code stored in a custom code repository and a BPH of business processes stored in a business process repository. The system also can include a business process to code mapping module. The module can include computer program instructions hosted by the operating system.

The instructions when loaded into the memory and executed by the processor cause the computer to establish a connection from a business process to code mapping module executing in memory by a processor of a computer to a source pre-packaged computing solution, to extract both a BPH from the business process repository and customized program code from the custom code repository and to store the BPH and the extracted customized program code in storage coupled to the computer. The instructions when loaded into memory and executed by the processor further cause the computer to select a business process in the BPH, to map the selected business process to corresponding portions of the customized program code, and to direct the generation and display in the computer of a dependency graph of the mapped portions of the customized program code in the storage. Of note, the dependency graph indicates dependency relationships of the mapped portions of the customized program code for the selected business process of the BPH of the source pre-packaged computing solution.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for visualizing portions of customized code mapped to a selected business process in a BPH of a pre-packaged computing solution. In accordance with an embodiment of the invention, a BPH and customized code for the BPH can be extracted from a source pre-packaged solution and a business process in the BPH can be selected. Portions of the customized code can be mapped to the selected business process according to mapping criteria. Exemplary mapping criteria can include identifying portions of customized code configured to process transactions as part of activities for business processes steps of a selected business process. Thereafter, a dependency graph of dependencies amongst the mapped portions of the customized code can be generated and displayed. In this way, the relationships between the customized code for a selected business process can be visualized to facilitate the transference of the business process from a source pre-packaged computing solution to a target pre-packaged computing solution.

Figure 1:
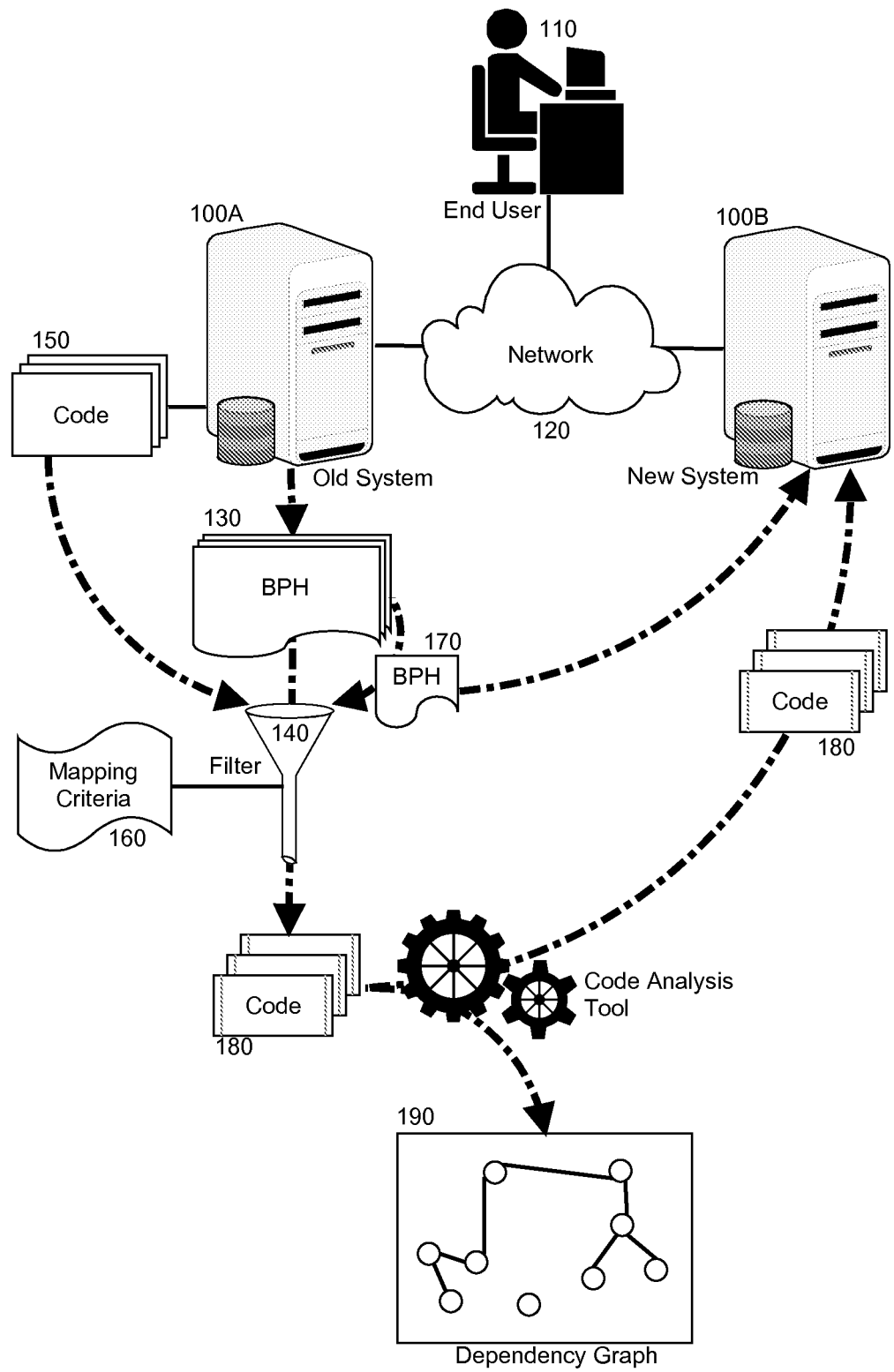
FIG. 1 is a pictorial illustration of a process for visualizing portions of customized code mapped to a selected business process in a BPH of a pre-packaged computing solution.

In further illustration, FIG. 1 pictorially shows a process for visualizing portions of customized code mapped to a selected business process in a BPH of a pre-packaged computing solution. As shown in FIG. 1, an end user 110 can access a source pre-packaged computing solution 100A over a computer communications network 120. Specifically, the end user 110 can extract the customized code 150 and the BPH 130 of the source pre-packaged computing solution 100A. The extraction is performed by calling a set of services running on the pre-packaged computing solution 100A and pre-configured to extract customized code in general. The end user 110 can select a business process 170 in the BPH 130 and mapping criteria 140 can be used to map the selected business process to the portions 180 of the customized code 150 corresponding to the selected business process 170. For example, a business process can be associated with a transaction identifier associated with an entry point, which is implemented by one piece of customized code, and depends on other pieces of customized code.

Thereafter, a code analysis tool 160 can determine dependency relationships between the portions 180 of the customized code 150, for example by analyzing method call relationships or internal references to one another amongst the portions 180 of the customized code 150. The code analysis tool 160 can visualize the dependency relationships in a dependency graph 190 displayable on screen of a computer of the end user 110 in order to facilitate an understanding by the end user 110 of the accounting of the portions 180 of the customized code 150 for the selected business process 170 and the dependency relationships therebetweeen. The dependency graph 190 in turn can assist the end user 110 in the migration of the selected business process 170 and corresponding portions 180 of the customized code 150 from the source pre-packaged computing solution 100A to a target pre-packaged computing solution 100B.

Figure 2:
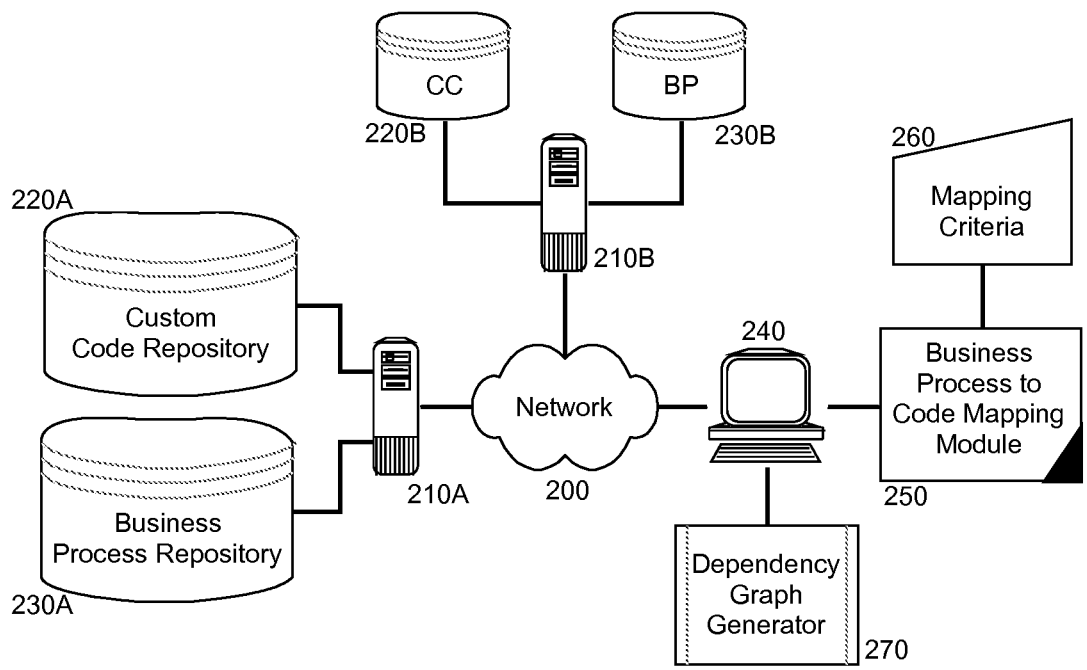
FIG. 2 is a schematic illustration of a code mapping data processing system configured for visualizing portions of customized code mapped to a selected business process in a BPH of a pre-packaged computing solution; and, FIG. 3 is a flow chart illustrating a process for visualizing portions of customized code mapped to a selected business process in a BPH of a pre-packaged computing solution.

The process described in connection with FIG. 1 can be implemented within a code mapping data processing system. In further illustration, FIG. 2 schematically shows a code mapping data processing system configured for visualizing portions of customized code mapped to a selected business process in a BPH of a pre-packaged computing solution. The system can include a source host server 210A with processor and memory, supporting a source pre-packaged computing solution, and a target host server 210B with processor and memory, supporting a target pre-packaged computing solution. A custom code repository 220A and also a business process repository 230A can be coupled to the source host server 210A. Likewise, a custom code repository 220B and also a business process repository 230B can be coupled to the target host server 210B. In each case, the custom code repository 220A, 220B can store custom code executable by transactions of corresponding activities of business process steps of corresponding business processes in a BPH. Correspondingly, in each case the business process repository 230A, 230B can store different business processes in a hierarchical arrangement amongst one another.

A computer 240 with processor and memory can be coupled to both the source host server 210A and the target host server 210B from over computer communications network 200. The computer 240 can support the execution in memory by its processor of business process to code mapping module 250. The business process to code mapping module 250 can include program code executable in the memory by the processor to apply mapping criteria 260 to a selected business process in a BPH extracted from the business process repository 230A and customized program code extracted from the custom code repository 220A to identify portions of the customized program code related to the selected business process. The computer 240 further can support the execution in memory by its processor of a dependency graph generator 270 which when executed computes and renders a dependency graph of the identified portions of the customized program code to facilitate the updating of the target pre-packaged computing solution in the target host server 210B with selected portions of the customized program code into the custom code repository 220B and selected business processes in the BPH in the business process repository 230B.

Figure 3:
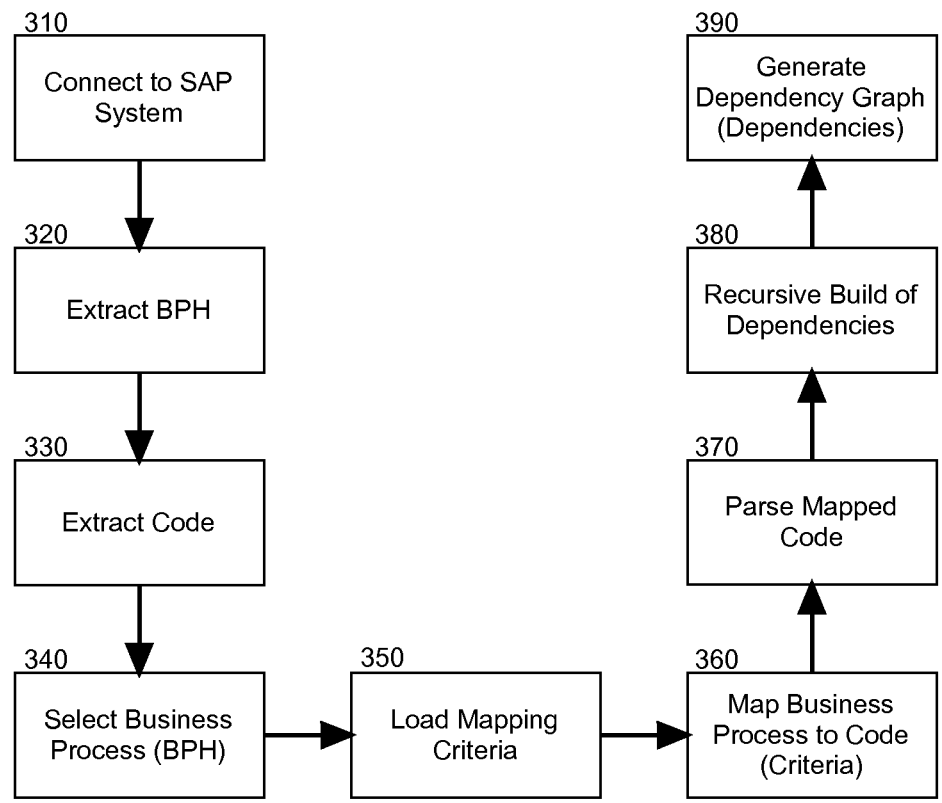

In even yet further illustration of the operation of the business process to code mapping module 250 and the dependency graph generator 270, FIG. 3 is a flow chart illustrating a process for visualizing portions of customized code mapped to a selected business process in a BPH of a pre-packaged computing solution. Beginning in block 310, an end user can be communicatively connected to a source pre-packaged computing solution. Once properly authenticated, in block 320 a BPH can be extracted from the source pre-packaged computing solution along with customized program code for the BPH in block 330.

In block 340, a business process in the BPH can be selected and mapping criteria—namely rules for mapping portions of the customized program code to a selected business process can be loaded in block 350. In block 360, the selected business process can be mapped to portions of the customized program code and in block 370, the mapped portions of the customized program code can be parsed to identify references and calls amongst the portions of the customized program code, and more particularly, in block 380 the dependencies therebetweeen can be determined by recursively walking the references in each of the mapped and parsed portions of the customized program code. Finally, in block 390, a dependency graph of the mapped portions of the customized program code can be generated for display to the end user. The end user in turn can use the display of the dependency graph to better assess a migration from the source pre-packaged computing solution to a target pre-packaged computing solution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A computer-implemented mapping method in a customizable pre-packaged computing solution, the method comprising:

establishing a connection from a business process to code mapping module executing in memory by a processor of a computer to a source customizable pre-packaged computing solution;

extracting both a business process hierarchy (BPH) and customized program code from the source customizable pre-packaged computing solution and storing the BPH and the extracted customized program code in storage coupled to the computer;

selecting a business process in the BPH;

mapping the selected business process to corresponding portions of the customized program code; and, generating and displaying in the computer a dependency graph of the mapped portions of the customized program code in the storage, the dependency graph indicating dependency relationships of the mapped portions of the customized program code for the selected business process of the BPH of the source customizable pre-packaged computing solution.

2. The method of claim 1, further comprising transporting the BPH and the mapped portions of the customized program code from the storage of the computer to a target customizable pre-packaged computing solution.

3. The method of claim 1, wherein mapping the selected business process to corresponding portions of the customized program code, comprises:

loading mapping criteria; and, applying the mapping criteria to the selected business process to identify the portions of the customized program code corresponding to the selected business process.

4. The method of claim 3, wherein loading mapping criteria comprises loading a set of rules specifying a process for identifying the portions of the customized program code corresponding to the selected business process.

5. The method of claim 4, wherein the set of rules specify the identification of the portions of the customized program code for different transactions of different activities of different business process steps of the selected business process.

6. A code mapping data processing system comprising:

a computer with processor, memory, fixed storage and an operating system executing therein, the computer being coupled to a customizable pre-packaged computing solution over a computer communications network, the customizable pre-packaged computing solution comprising customized program code stored in a custom code repository and a business process hierarchy (BPH) of business processes stored in a business process repository; and, a business process to code mapping module comprising computer program instructions hosted by the operating system, the instructions when loaded into the memory and executed by the processor cause the computer to perform the steps of:

establishing a connection from the business process to code mapping module executing in memory by a processor of a computer to a source customizable pre-packaged computing solution;

extracting both a BPH from the business process repository and customized program code from the custom code repository and storing the BPH and the extracted customized program code in storage coupled to the computer;

selecting a business process in the BPH;

mapping the selected business process to corresponding portions of the customized program code; and, directing the generation and display in the computer a dependency graph of the mapped portions of the customized program code in the storage, the dependency graph indicating dependency relationships of the mapped portions of the customized program code for the selected business process of the BPH of the source customizable pre-packaged computing solution.

7. The system of claim 6, wherein the instructions when loaded into the memory and executed by the processor further cause the computer to perform the step of transporting the BPH and the mapped portions of the customized program code from the storage of the computer to a target customizable pre-packaged computing solution.

8. A computer program product comprising a computer usable storage memory embodying computer usable program code for business process to customized program code mapping in a customizable pre-packaged computing solution, the computer program product comprising:

computer usable program code for establishing a connection from a business process to code mapping module executing in memory by a processor of a computer to a source customizable pre-packaged computing solution;

computer usable program code for extracting both a business process hierarchy (BPH) and customized program code from the source customizable pre-packaged computing solution and storing the BPH and the extracted customized program code in storage coupled to the computer;

computer usable program code for selecting a business process in the BPH;

computer usable program code for mapping the selected business process to corresponding portions of the customized program code; and, computer usable program code for generating and displaying in the computer a dependency graph of the mapped portions of the customized program code in the storage, the dependency graph indicating dependency relationships of the mapped portions of the customized program code for the selected business process of the BPH of the source customizable pre-packaged computing solution.

9. The computer program product of claim 8, further comprising computer usable program code for transporting the BPH and the mapped portions of the customized program code from the storage of the computer to a target pre-packaged computing solution.

10. The computer program product of claim 8, wherein the computer usable program code for mapping the selected business process to corresponding portions of the customized program code, comprises:
  computer usable program code for loading mapping criteria; and,
  computer usable program code for applying the mapping criteria to the selected business process to identify the portions of the customized program code corresponding to the selected business process.

11. The computer program product of claim 10, wherein the computer usable program code for loading mapping criteria comprises computer usable program code for loading a set of rules specifying a process for identifying the portions of the customized program code corresponding to the selected business process.

12. The computer program product of claim 11, wherein the set of rules specify the identification of the portions of the customized program code for different transactions of different activities of different business process steps of the selected business process.

* * * * *